United States Patent
Sivakumar et al.

(10) Patent No.: US 12,554,735 B1
(45) Date of Patent: Feb. 17, 2026

(54) OPTIMIZING COMPUTATIONAL MODELS USING VISUALIZATIONS OF DATA SAMPLES

(71) Applicant: International Business Machines Corporation, Armonk, NY (US)

(72) Inventors: Gandhi Sivakumar, Mountain View, CA (US); Prasanth Gelli, Vijayawada (IN); Nikhil Sai Krishna Jonnavithula, Visakhapatnam (IN); Arunasaraswathy P, Madurai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/009,228

(22) Filed: Jan. 3, 2025

(51) Int. Cl.
*G06F 16/248* (2019.01)
*G06F 16/28* (2019.01)

(52) U.S. Cl.
CPC .......... *G06F 16/248* (2019.01); *G06F 16/288* (2019.01)

(58) Field of Classification Search
None
See application file for complete search history.

(56) References Cited

U.S. PATENT DOCUMENTS

| | | | |
|---|---|---|---|
| 11,243,919 B2 | 2/2022 | Bartlett et al. | |
| 11,687,571 B2 | 6/2023 | Doyle et al. | |
| 11,995,518 B2 | 5/2024 | Zavesky et al. | |
| 12,147,554 B2 * | 11/2024 | Lu | G06F 21/6218 |
| 12,210,501 B1 * | 1/2025 | Li | G06F 16/22 |
| 12,287,814 B2 * | 4/2025 | Asija | G06F 16/282 |
| 12,340,332 B2 * | 6/2025 | Tr | G06F 40/242 |
| 12,407,707 B2 * | 9/2025 | Spears | H04L 63/1433 |
| 2018/0052878 A1 | 2/2018 | Seetharaman et al. | |
| 2023/0091775 A1 | 3/2023 | Manzano et al. | |
| 2023/0169147 A1 * | 6/2023 | Sivakumar | G06N 5/02 |
| | | | 382/159 |
| 2023/0195845 A1 | 6/2023 | Dasgupta et al. | |

(Continued)

FOREIGN PATENT DOCUMENTS

CN 108073686 B 1/2022

OTHER PUBLICATIONS

Data Visualization Optimization via Computational Modeling of Perception (Year: 2011).*

(Continued)

*Primary Examiner* — Kim T Nguyen
(74) *Attorney, Agent, or Firm* — Yee & Associates, P.C.

(57) ABSTRACT

A computer-implemented method is provided. A processor set receives a dataset comprising a set of data and metadata associated with the set of data from a database. The processor set generates a number of outputs by inputting the set of data and the metadata to a computational model. The processor set associates the number of outputs to the dataset to generate a number of associations. The processor set creates a number of visualizations based on context from the number of associations using a graphical user interface. The processor set removes a subset of data from the set of data and a subset of metadata associated with the subset of data from the metadata based on the visualizations to generate an updated dataset. The processor set updates functions for the computational model based on the visualizations. The processor set generates updated outputs by inputting the updated dataset to the computational model.

20 Claims, 6 Drawing Sheets

(56) References Cited

U.S. PATENT DOCUMENTS

| | | | |
|---|---|---|---|
| 2023/0297705 A1* | 9/2023 | Lu ..................... | G06F 21/6218 |
| | | | 726/28 |
| 2024/0056465 A1* | 2/2024 | Spears .................. | G06N 3/094 |
| 2024/0281697 A1* | 8/2024 | Patel ..................... | G06N 20/00 |
| 2024/0346051 A1* | 10/2024 | Isman .................. | G06F 16/288 |
| 2024/0427741 A1* | 12/2024 | Li .......................... | G06F 16/21 |
| 2025/0013618 A1* | 1/2025 | Li .......................... | G06F 16/22 |
| 2025/0036660 A1* | 1/2025 | Asija .................... | G06F 16/282 |
| 2025/0117825 A1* | 4/2025 | Longo ................... | G06N 20/00 |
| 2025/0139106 A1* | 5/2025 | Rao Karikurve ......................... |
| | | | G06F 16/24578 |
| 2025/0147485 A1* | 5/2025 | Hegde ................ | G05B 19/4099 |
| 2025/0147753 A1* | 5/2025 | Gul ......................... | G06N 5/04 |
| 2025/0173318 A1* | 5/2025 | Li .......................... | G06F 16/22 |
| 2025/0232192 A1* | 7/2025 | Wamburu .............. | G06N 5/022 |
| 2025/0238720 A1* | 7/2025 | Susaiyah ................ | G16H 50/70 |
| 2025/0245239 A1* | 7/2025 | Glazer ................. | G06F 16/287 |
| 2025/0245435 A1* | 7/2025 | Chandrahasan ........ | G06F 40/30 |
| 2025/0259753 A1* | 8/2025 | Narovlyansky ........ | G16H 10/60 |
| 2025/0328629 A1* | 10/2025 | Sali ........................ | G06N 20/00 |
| 2025/0335214 A1* | 10/2025 | Wen ....................... | G06F 9/451 |
| 2025/0358310 A1* | 11/2025 | Spears ............... | H04L 63/1433 |

OTHER PUBLICATIONS

Colt: Concept Lineage Tool for Data Flow Metadata Capture and Analysis (Year: 2017).*

Park et al., "Visualization-Aware Sampling for Very Large Databases", arXiv:1510.03921v2, https://arxiv.org/pdf/1510.03921, Jan. 23, 2017, 12 pages.

* cited by examiner

OPTIMIZING COMPUTATIONAL MODELS USING VISUALIZATIONS OF DATA SAMPLES

BACKGROUND

The disclosure relates generally to optimizing computational models using visualizations of data samples.

Data lineage refers to the complete record of the origins, transformations, movements and destinations of data within a system. Data lineage tracks the "life cycle" of data as data progresses through various stages and capturing the relationships between data sources, transformation processes, storage locations, and eventual uses. In this case, data lineage provides a structured map that details how data flows across systems, which steps impact data integrity, how data has evolved, supporting data quality, compliance, and transparency in model optimization practices.

Data lineage plays an essential role in optimizing data quality and supporting complex data analytic processes. Understanding the transformations and sources of data helps users to identify inaccuracies or inefficiencies within data pipelines, leading to more effective troubleshooting. In addition, knowledge of data lineage allows users to validate data sources and transformations for ensuring that the insights and predictions derived from models are based on reliable, quality-controlled data. In other words, data lineage provides a means that can support a variety of tasks ranging from simple data verification to highly complex, data-driven decision making processes.

SUMMARY

According to one illustrative embodiment, a computer-implemented method for optimizing computational models is provided. A processor set receives a dataset comprising a set of data and metadata associated with the set of data from a database. The dataset is input data for a computational model. The processor set generates a number of outputs by inputting the set of data and the metadata to the computational model. The processor set associates the number of outputs to the dataset to generate a number of associations. The processor set creates a number of visualizations based on context from the number of associations using a graphical user interface. The processor set removes a subset of data from the set of data and a subset of metadata associated with the subset of data from the metadata based on the number of visualizations to generate an updated dataset. The processor set updates functions for the computational model based on the number of visualizations. The processor set generates updated outputs using the computational model by inputting the updated dataset to the computational model. According to other illustrative embodiments, a computer system, and a computer program product for optimizing computational models are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
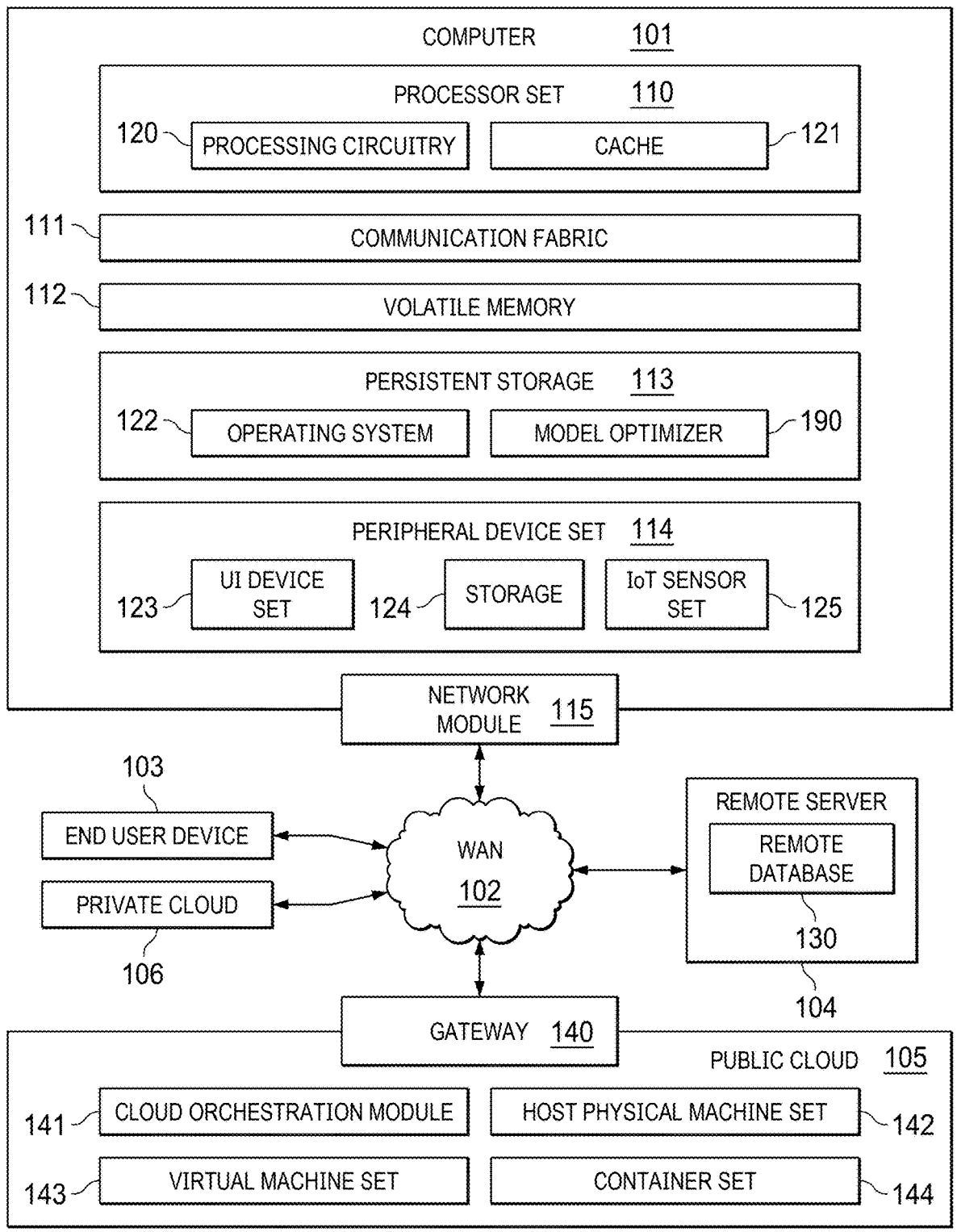
FIG. 1 is a pictorial representation of a computing environment in which illustrative embodiments may be implemented.

With reference now to the figures, and in particular with reference to FIG. 1, a block diagram of a computing environment is depicted in accordance with an illustrative embodiment. Computing environment 100 contains an example of an environment for the execution of at least some of the computer code involved in performing the inventive methods, such as model optimizer 190. In addition to model optimizer 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and model optimizer 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one or more computer processors of any type now known or to be developed in the future. Processing circuitry 120 may be distributed over multiple packages, for example, multiple coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions and associated data are accessed by processor set 110 to control and direct performance of the inventive methods. In computing environment 100, at least some of the instructions for performing the inventive methods may be stored in model optimizer 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but, alternatively or additionally, volatile memory 112 may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in model optimizer 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as a thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data application portability between the multiple constituent clouds. In this embodiment, public cloud 105 and private cloud 106 are both part of a larger hybrid cloud.

CLOUD COMPUTING SERVICES AND/OR MICROSERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. For example, the illustrative embodiments recognize and take into account that analyzing data lineage is crucial for optimizing computational models because it provides insights into how data sources and data transformations impact model performance, accuracy, and reliability.

The illustrative embodiments also recognize and take into account that a clustering model is built using various data sampling techniques and there is no means to perform analysis of data lineage to determine whether the clustering model is influenced by high quality data samples.

The illustrative embodiments also recognize and take into account that the capability of visualizing a model overlaid on context associated with data samples can be used for determining data lineage and whether the computational model built based on the data samples is influenced by high quality data samples.

Thus, illustrative embodiments of the present invention provide a computer implemented method, computer system, and computer program product for optimizing computational models. A processor set receives a dataset comprising a set of data and metadata associated with the set of data from a database. The dataset is input data for a computational model. The processor set generates a number of outputs by inputting the set of data and the metadata to the computational model. The processor set associates the number of outputs to the dataset to generate a number of associations. The processor set creates a number of visualizations based on context from the number of associations using a graphical user interface. The processor set removes a subset of data from the set of data and a subset of metadata associated with the subset of data from the metadata based on the number of visualizations to generate an updated dataset. The processor set updates functions for the computational model based on the number of visualizations. The processor set generates updated outputs using the computational model by inputting the updated dataset to the computational model.

Figure 2:
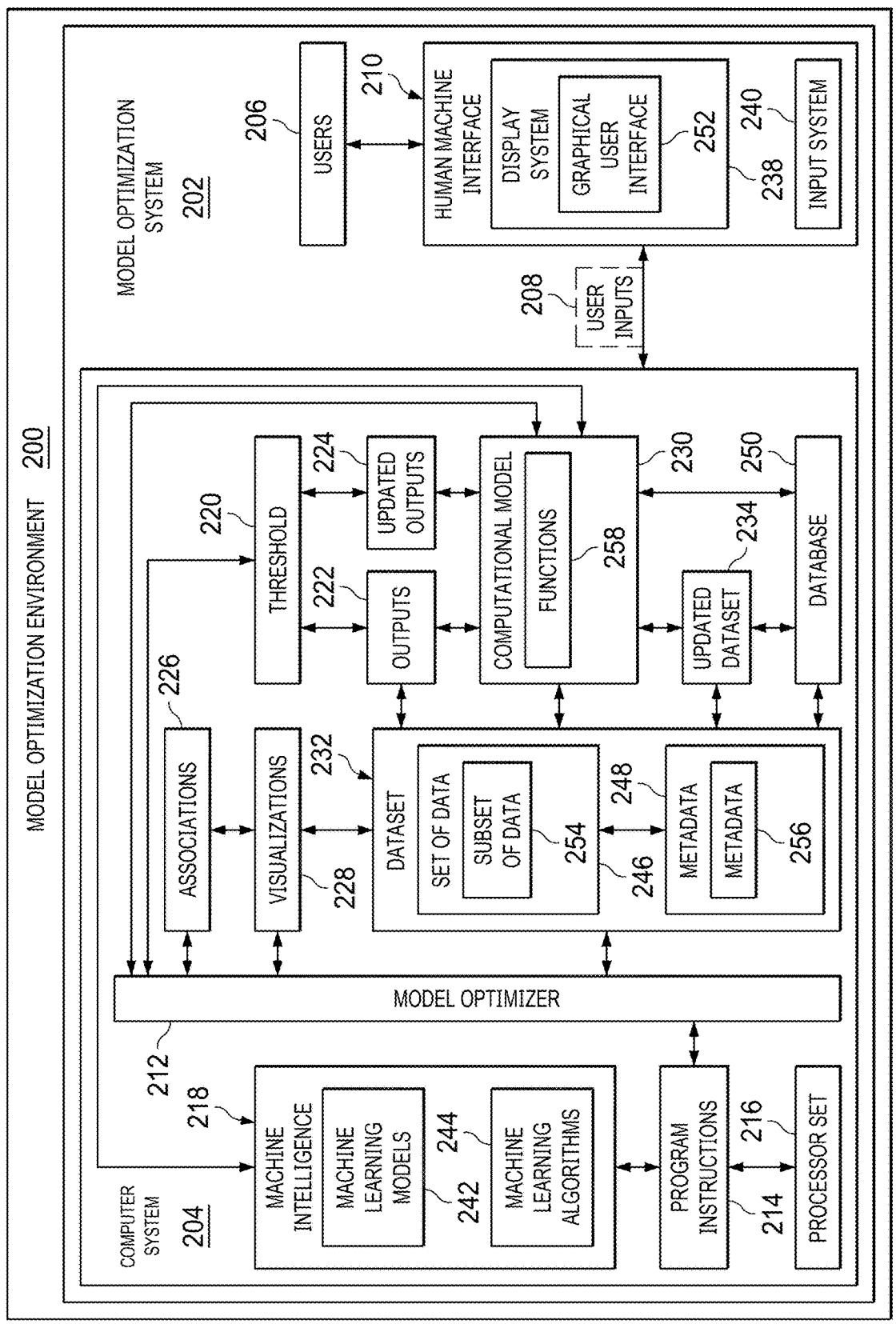
FIG. 2 is an illustration of a block diagram of a model optimization environment in accordance with an illustrative embodiment.

With reference now to FIG. 2, an illustration of a block diagram of a model optimization environment is depicted in accordance with an illustrative embodiment. In this illustrative example, model optimization environment 200 includes components that can be implemented in hardware such as the hardware shown in computing environment 100 in FIG. 1.

In this illustrative example, model optimization system 202 in model optimization environment 200 can be used to optimize computational model 230. In this illustrative example, model optimization system 202 includes computer system 204 which includes model optimizer 212. Model optimizer 212 is located in computer system 204. Model optimizer 212 may be implemented using model optimizer 190 in FIG. 1.

Model optimizer 212 can be implemented in software, hardware, firmware, or a combination thereof. When software is used, the operations performed by model optimizer 212 can be implemented in program instructions configured to run on hardware, such as a processor unit. When firmware is used, the operations performed by model optimizer 212 can be implemented in program instructions and data and stored in persistent memory to run on a processor unit. When hardware is employed, the hardware can include circuits that operate to perform the operations in model optimizer 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 110 in FIG. 1. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

As depicted, computer system 204 includes machine intelligence 218. Machine intelligence 218 can include machine learning models 242 and machine learning algorithms 244. Machine learning models 242 is a branch of artificial intelligence (AI) that enables computers to detect patterns and improve performance without direct programming commands. Rather than relying on direct input commands to complete a task, machine learning models 242 relies on input data. The data is fed into the machine, one of machine learning algorithms 244 is selected, parameters for the data are configured, and the machine is instructed to find patterns in the input data through optimization algorithms. The data model formed from analyzing the data is then used to predict future values.

Machine intelligence 218 is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching machine intelligence 218.

Machine intelligence 218 can be implemented using one or more systems such as an artificial intelligence system, a neural network, a generative neural network, a Bayesian network, an expert system, a fuzzy logic system, a genetic algorithm, or other suitable types of systems. Machine learning models 242 and machine learning algorithms 244 may make computer system 204 a special purpose computer for optimizing computational models.

Machine learning models 242 involves using machine learning algorithms 244 to build computation models based on samples of data. The samples of data used for training are referred to as training data or training datasets. Machine intelligence 218 can make predictions without being explicitly programmed to make these predictions. Machine intelligence 218 can be used for training and retraining computation models for a number of different types of applications. These applications include, for example, medicine, financial services, healthcare, speech recognition, computer vision, or other types of applications.

In this illustrative example, machine learning models 242 can include a number of models. For example, computational model 230 can be a model selected from machine learning models 242. In this illustrative example, computational model 230 can be a clustering model, prediction model, classification model, or any suitable computational models.

In this illustrative example, machine learning algorithms 244 can include supervised machine learning algorithms and unsupervised machine learning algorithms. Supervised machine learning can train machine learning models using data containing both the inputs and desired outputs. Examples of machine learning algorithms include XGBoost, K-means clustering, and random forest. In addition, machine learning algorithms 244 can also include semi-supervised learning which necessitates human involvement for input validations.

As depicted, model optimizer 212 can receive dataset 232 from database 250. Dataset 232 includes set of data 246 and metadata 248. In this illustrative example, database 250 is a digital repository that can be used to structure, store, manage, and access collections of data. For example, model optimizer 212 can receive set of data 246 and metadata 248 that is associated with set of data 246 from database 250. In this example, metadata 248 is descriptive information that provides context, structure, and details about the characteristics and content for data in set of data 246.

In this illustrative example, dataset 232 is input data for computational model 230. Model optimizer 212 can input dataset 232 to computational model 230 to generate outputs 222. In other words, outputs 222 are generated by computational model 230 upon receiving dataset 232 as input data. In this illustrative example, set of data 246 and metadata 248 can be indexed before they are used as input data for computational model 230. Indexing for set of data 246 and metadata 248 can help to provide a clear history of how set of data 246 is transformed during the process.

Model optimizer 212 can associate outputs 222 with dataset 232 to generate a number of associations 226. In this illustrative example, associations 226 are relational information for outputs 222 and dataset 232. Associations 226 can also include lineage or data lineage associated with each data point in set of data 246. As depicted, lineage or data lineage refers to the complete record of the origins, transformations, movements and destinations of data. In other words, model optimizer 212 can obtain information related to data lineage for dataset 232 by associating outputs 222 with dataset 232.

In this illustrative example, associations 226 can be generated in a number of ways. For example, if computational model 230 is a clustering model and outputs 222 is a number of clusters, model optimizer 212 can overlay dataset 232 onto the clusters from outputs 222 to indicate data lineage for dataset 232. As a result, a number of visualizations 228 is generated based on context from associations 226 as described above. In this illustrative example, visualizations 228 are data visualizations for showing relationships between outputs 222 and dataset 232 based on associations 226. For example, visualizations 228 can include the overlay of dataset 232 onto the clusters from outputs 222 as described above, or any data visualizations for presenting associations 226 between outputs 222 and dataset 232.

In this illustrative example, model optimizer 212 identifies subset of data 254 from set of data 246 in dataset 232 based on visualizations 228. Subset of data 254 are data that have little contributions or no contributions to output 222 generated by computational model 230. In other words, subset of data 254 is low quality data that makes no contributions to the efficiency or performance for computational model 230 when inputting set of data 246 into computational model 230.

In this illustrative example, model optimizer 212 can remove subset of data 254 from set of data 246 and metadata 256 that are associated with subset of data 254 from metadata 248 to generate updated dataset 234. In other words, updated dataset 234 contains a portion of a set of data 246 without subset of data 254 and a portion of metadata 248 without metadata 256. In this illustrative example, subset of data 254 can be removed automatically using machine learning models 242 or removed manually through user inputs.

In addition, model optimizer 212 can update computational model 230 when subset of data 254 and metadata 256 are removed from dataset 232 to generate updated dataset 234. For example, functions 258 for computational model 230 can be updated based on updated dataset 234. In this illustrative example, functions 258 can be updated in a number of ways. For example, model optimizer 212 can automatically update functions 258 using machine intelligence 218 or according to a set of user-defined rules. In an alternative example, model optimizer 212 can update functions 258 manually through user inputs.

Subsequently, model optimizer 212 updates database 250 using updated dataset 234 and functions 258 after functions 258 are updated. In this illustrative example, model optimizer 212 uses updated dataset 234 as input for computational model 230 to generate updated outputs 224.

Model optimizer 212 can determine whether functions 258 needs further optimization based on updated outputs 224. In this illustrative example, the determination can be performed in a number of ways. For example, another set of associations and visualizations can be generated based on updated outputs 224 such that model optimizer 212 can determine whether more data needs to be removed from updated dataset 234 for optimizing functions 258.

In an alternative example, model optimizer 212 can use a number of metrics to determine whether functions 258 needs further optimization. For example, model optimizer 212 can use threshold 220 to determine if functions 258 needs further optimization. In this example, threshold 220 is a pre-defined value for determining whether functions 258 needs further optimization. In other words, functions 258 do not need further optimization if analysis based on updated outputs 224 and updated dataset 234 meets threshold 220.

On the other hand, if analysis based on updated outputs 224 and updated dataset 234 does meet threshold 220, model optimizer 212 uses updated dataset 234 and updated outputs 224 as new input and output for computational model 230 to generate new associations and new visualizations for updating functions 258 until threshold 220 is met. In other words, model optimizer 212 initiates an iterative process for updating functions 258 using the method described above until functions 258 for computational model 230 is optimized.

In this illustrative example, users 206 can interact with computer system 204 via user inputs 208. User inputs 208 can be generated by users 206 using human machine interface (HMI) 210. As depicted, human machine interface 210 includes display system 238 and input system 240. Display system 238 is a physical hardware system and includes one or more display devices on which graphical user interface 252 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, virtual reality headsets, or some other suitable device that can output information for the visual presentation of information.

In this example, users 206 are people that can interact with graphical user interface 252 through user inputs 208 generated by input system 240. For example, user inputs 208 can include manual selection of subset of data 254 rules for updating functions 258, or updated parameters for functions 258. Input system 240 is a physical hardware system and can be selected from at least one of a mouse, a keyboard, a touch pad, a trackball, a touchscreen, a stylus, a motion sensing input device, a gesture detection device, a data glove, a cyber glove, a haptic feedback device, or some other suitable type of input device. In this illustrative example, users 206 can view associations 226, visualizations 228, dataset 232, outputs 222, updated dataset 234, updated outputs 224, and functions 258 through graphical user interface 252.

In one illustrative example, one or more solutions are present that overcome a problem with optimizing computational models by removing model bias. As a result, one or more technical solutions may provide an ability to increase the efficiency for transforming data for computer system 204.

In the illustrative example, computer system 204 can be configured to perform at least one of the steps, operations, or actions described in the different illustrative examples using software, hardware, firmware, or a combination thereof. As a result, computer system 204 operates as a special purpose computer system in which model optimizer 212 in computer system 204 enables optimization of computational models through analyzing associations between input data and output data for the computational models. In particular, model optimizer 212 transforms computer system 204 into a special purpose computer system as compared to currently available general computer systems that do not have a model optimizer 212.

The illustration of model optimization environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
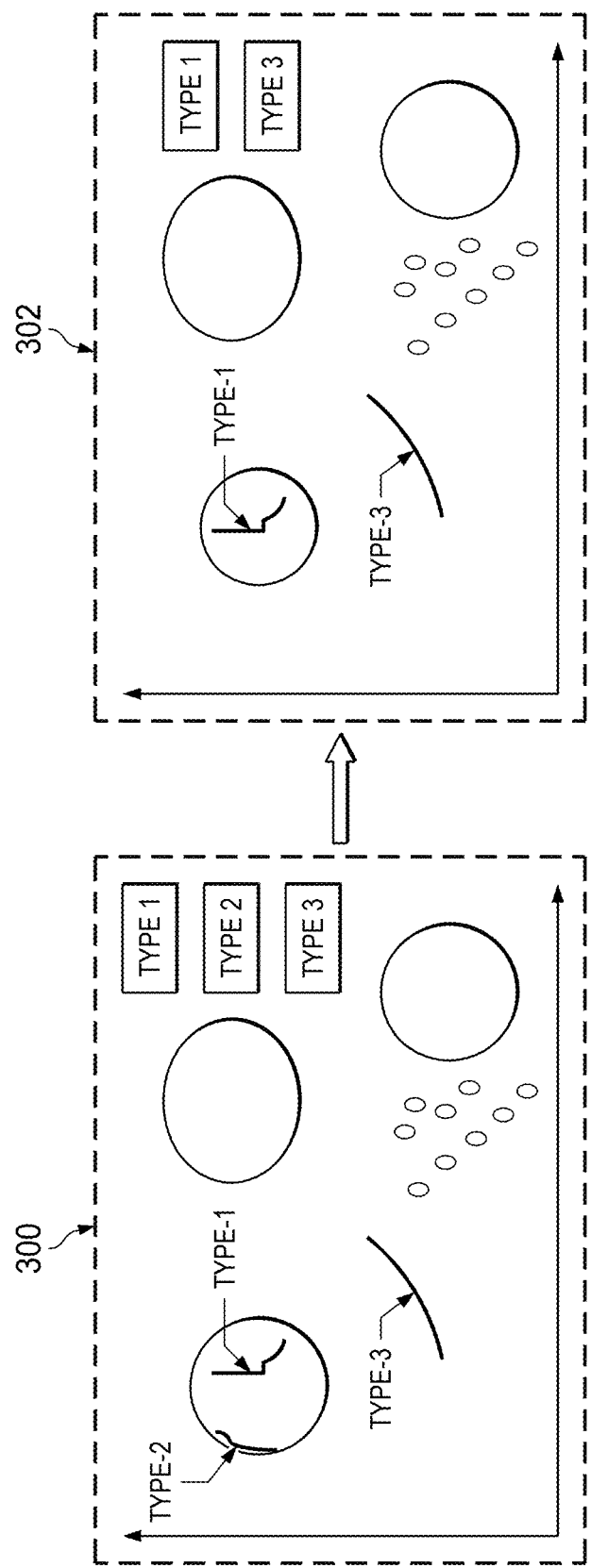
FIG. 3 is an illustration of removing a portion of data in a dataset based on visualization in accordance with an illustrative embodiment.

With reference now to FIG. 3, an illustration of removing a portion of data in a dataset based on visualization is shown in accordance with an illustrative embodiment. In this example, the process of removing a portion of data can be performed using model optimizer 212 in computer system 204 in FIG. 2.

In FIG. 3, visualization 300 shows a plot that presents overlay of input data from a dataset onto the clusters from output data that is generated by feeding input data into a clustering model. In this illustrative example, input data has different types such as "Type-1", "Type-2", and "Type-3".

As depicted, the clustering model classifies different types of input data into clusters that are shown in visualization 300. For example, "Type-1" input data and "Type-2" input data are classified into same cluster while "Type-3" input data does not belong to any clusters in visualization 300.

In visualization 300, overlay of "Type-2" input data on clusters indicates that "Type-2" input data are located at the edge of a cluster. In other words, "Type-2" input data are low quality data for clustering purposes and has little contribution to the clustering process. In this illustrative example, "Type-2" input data can be removed from the dataset such that the performance and efficiency can be improved. As depicted, "Type-2" input data can be removed manually through user-input after viewing visualization 300 or removed automatically using machine learning models such as machine learning models 242 in FIG. 2.

In this illustrative example, visualization 302 shows an overlay of input data onto clusters from output data generated by feeding input data into the clustering model. As depicted, "Type-2" input data is removed from input data and therefore visualization 300 does not include any overlay for "Type-2" input data.

The illustration of visualization 300 and visualization 302 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, visualization 300 and visualization 302 can be any kind of data visualizations instead of plots. In another example, other types of input data in addition to "Type-2" input data can also be removed to improve efficiency and performance of the clustering model. For example, "Type-3" input data can be removed from the dataset since it does not contribute to the clustering process.

Figure 4:
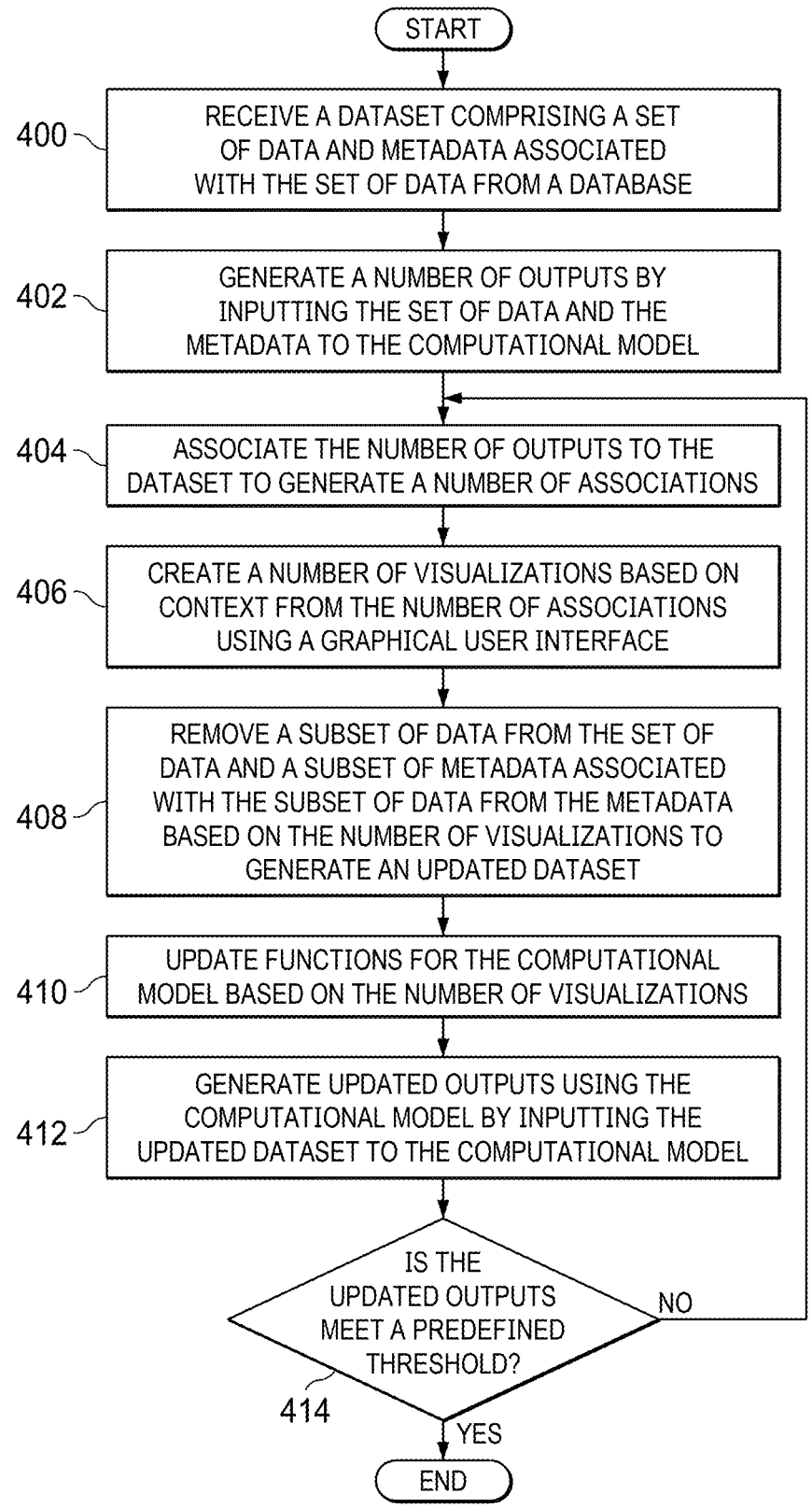
FIG. 4 is an illustration of a process flow for optimizing computational models in accordance with an illustrative embodiment.

With reference now to FIG. 4, a flowchart illustrating a process for optimizing computational models is shown in accordance with an illustrative embodiment. The process in FIG. 4 can be implemented in hardware, software, or both. When implemented in software, the process can take the form of program instructions that are run by one of more processor units located in one or more hardware devices in one or more computer systems. For example, the process can be implemented in model optimizer 212 in computer system 204 in FIG. 2.

The process begins by receiving a dataset comprising a set of data and metadata associated with the set of data from a database (step 400). In this step, the dataset is input data for a computational model. The process generates a number of outputs by inputting the set of data and the metadata to the computational model (step 402).

The process associates the number of outputs to dataset to generate a number of associations (step 404). The process creates a number of visualizations based on context from the number of associations using a graphical user interface (step 406). The process removes a subset of data from the set of data and a subset of metadata associated with the subset of data from the metadata based on the number of visualizations to generate an updated dataset (step 408). The process updates functions for the computational model based on the number of visualizations (step 410). The process generates updated outputs using the computational model by inputting the updated dataset to the computational model (step 412). The process begins by determining whether the updated outputs meet a pre-defined threshold (step 414). If the updated outputs meet the pre-defined threshold, the process terminates thereafter. With reference again to step 414, if the updated outputs do not meet a pre-defined threshold, the process repeats step 404 to step 414 based on the updated outputs and the updated dataset until the updated output generated from the computational model meets the pre-defined threshold. In other words, the process uses the updated outputs as the number of outputs and repeats step 404 to step 414 until the updated output generated from the computational model meets the pre-defined threshold. The process terminates thereafter.

Figure 5:
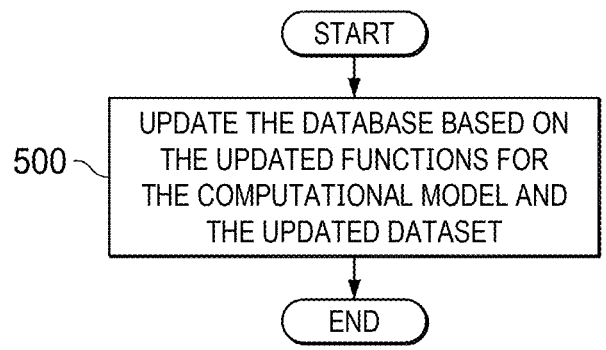
FIG. 5 is an illustration of a process for updating the database in accordance with an illustrative embodiment.

Turning next to FIG. 5, a flowchart of a process for updating the database is depicted in accordance with an illustrative embodiment. The process in this figure is an example of an additional step that can be performed with the steps in FIG. 4.

The process begins by updating the database based on the updated functions for the computational model and the updated dataset (step 500). The process terminates thereafter.

Figure 6:
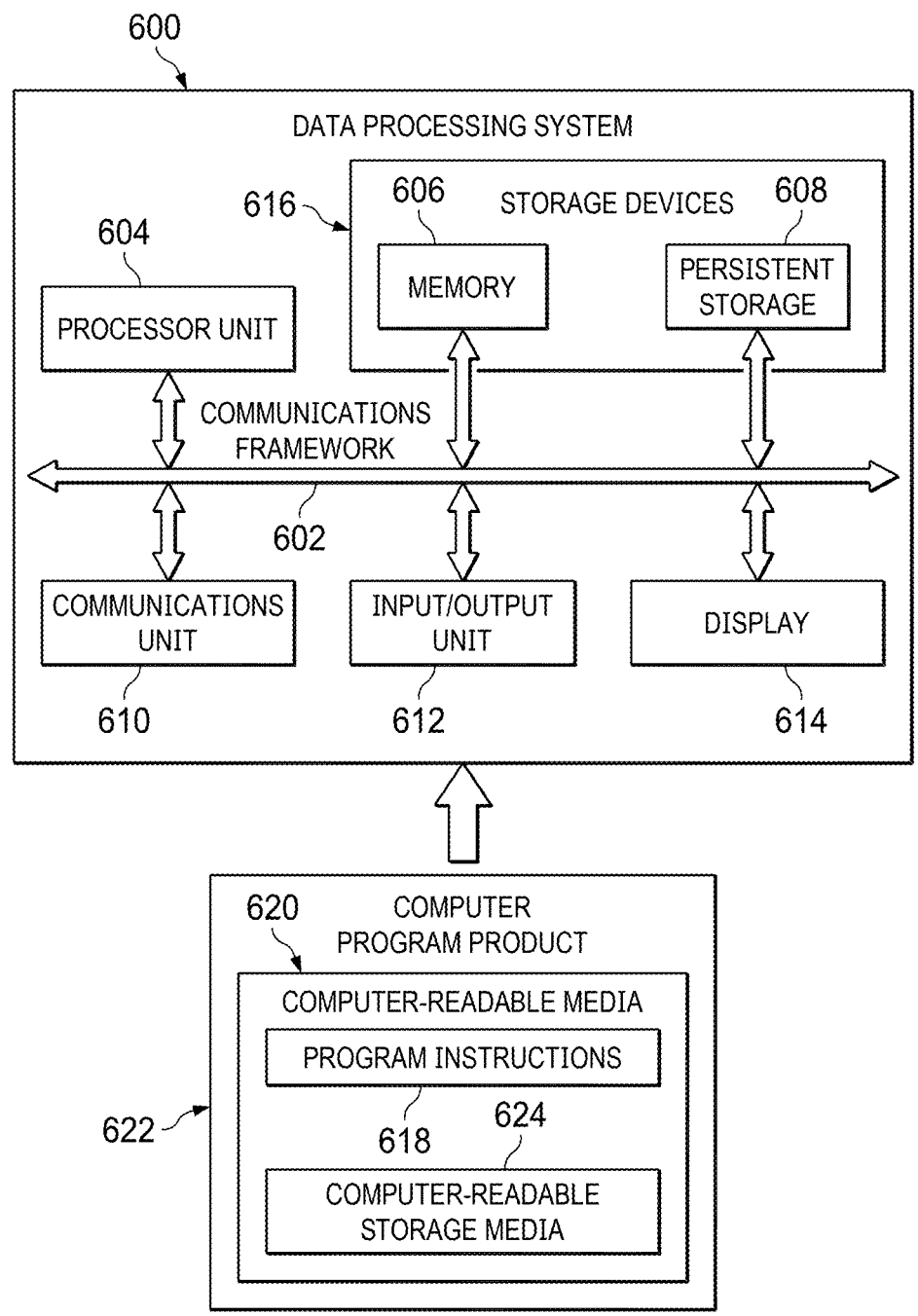
FIG. 6 is a block diagram of a data processing system in accordance with an illustrative embodiment.

Turning now to FIG. 6, a block diagram of a data processing system is depicted in accordance with an illustrative embodiment. Data processing system 600 can be used to implement computers and computing devices in computing environment 100 in FIG. 1. Data processing system 600 can also be used to implement computer system 204 in FIG. 2. In this illustrative example, data processing system 600 includes communications framework 602, which provides communications between processor unit 604, memory 606, persistent storage 608, communications unit 610, input/output (I/O) unit 612, and display 614. In this example, communications framework 602 takes the form of a bus system.

Processor unit 604 serves to execute instructions for software that can be loaded into memory 606. Processor unit 604 includes one or more processors. For example, processor unit 604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 604 can be implemented using one or more heterogeneous processor systems in which a main processor is present with secondary processors on a single chip. As another illustrative example, processor unit 604 can be a symmetric multiprocessor system containing multiple processors of the same type on a single chip.

Memory 606 and persistent storage 608 are examples of storage devices 616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 616 may also be referred to as computer-readable storage devices in these illustrative examples. Memory 606, in these examples, can be, for example, a random-access memory or any other suitable volatile or non-volatile storage device. Persistent storage 608 may take various forms, depending on the particular implementation.

For example, persistent storage 608 may contain one or more components or devices. For example, persistent storage 608 can be a hard drive, a solid-state drive (SSD), a flash memory, a rewritable optical disk, a rewritable magnetic tape, or some combination of the above. The media used by persistent storage 608 also can be removable. For example, a removable hard drive can be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that can be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs can be located in storage devices 616, which are in communication with processor unit 604 through communications framework 602. The processes of the different embodiments can be performed by processor unit 604 using computer-implemented instructions, which may be located in a memory, such as memory 606.

These instructions are referred to as program instructions, computer usable program instructions, or computer-readable program instructions that can be read and executed by a processor in processor unit 604. The program instructions in the different embodiments can be embodied on different physical or computer-readable storage media, such as memory 606 or persistent storage 608.

Program instructions 618 are located in a functional form on computer-readable media 620 that is selectively removable and can be loaded onto or transferred to data processing system 600 for execution by processor unit 604. Program instructions 618 and computer-readable media 620 form computer program product 622 in these illustrative examples. In the illustrative example, computer-readable media 620 is computer-readable storage media 624.

Computer-readable storage media 624 is a physical or tangible storage device used to store program instructions 618 rather than a medium that propagates or transmits program instructions 618. Computer-readable storage media 624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 618 can be transferred to data processing system 600 using a computer-readable signal media. The computer-readable signal media are signals and can be, for example, a propagated data signal containing program instructions 618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 620" can be singular or plural. For example, program instructions 618 can be located in computer-readable media 620 in the form of a single storage device or system. In another example, program instructions 618 can be located in computer-readable media 620 that is distributed in multiple data processing systems. In other words, some instructions in program instructions 618 can be located in one data processing system while other instructions in program instructions 618 can be located in another data processing system. For example, a portion of program instructions 618 can be located in computer-readable media 620 in a server computer while another portion of program instructions 618 can be located in computer-readable media 620 located in a set of client computers.

The different components illustrated for data processing system 600 are not meant to provide architectural limitations to the manner in which different embodiments can be implemented. In some illustrative examples, one or more of the components may be incorporated in or otherwise form a portion of another component. For example, memory 606, or portions thereof, may be incorporated in processor unit 604 in some illustrative examples. The different illustrative embodiments can be implemented in a data processing system including components in addition to or in place of those illustrated for data processing system 600. Other components shown in FIG. 6 can be varied from the illustrative examples shown. The different embodiments can be implemented using any hardware device or system capable of running program instructions 618.

Thus, illustrative embodiments of the present disclosure provide a computer-implemented method, computer system, and computer program product for managing containers. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for optimizing computational models, the computer implemented method comprising:

receiving, by a processor set, a dataset comprising a set of data and metadata associated with the set of data from a database, wherein the dataset is input data for a computational model;

generating, by the processor set using the computational model, a number of outputs by inputting the set of data and the metadata to the computational model;

associating, by the processor set, the number of outputs to the dataset to generate a number of associations, wherein the number of associations comprise data lineage associated with each data point in the set of data, and wherein the data lineage associated with each data points comprises complete record of origins, transformations, movements, and destinations of data for each data point in the set of data;

creating, by the processor set using a graphical user interface, a number of visualizations based on context from the number of associations;

automatically removing, by the processor set using a machine learning model, a subset of data from the set of data and a subset of metadata associated with the subset of data from the metadata based on the number of visualizations to generate an updated dataset;

updating, by the processor set, functions for the computational model based on the number of visualizations; and generating, by the processor set using the computational model, updated outputs by inputting the updated dataset to the computational model.

2. The computer implemented method of claim 1, further comprising:

determining, by the processor set, whether the updated outputs meet a pre-defined threshold; and in response to determining that the updated outputs do not meet a pre-defined threshold, repeating, by the processor set, the associating step, the creating step, the removing step, the updating step, and the generating step based on the updated outputs and the updated dataset until the updated dataset generated from the computational model meets the pre-defined threshold.

3. The computer implemented method of claim 1, further comprising:

updating, by the processor set, the database based on the updated functions for the computational model and the updated dataset.

4. The computer implemented method of claim 1, wherein the set of data and metadata associated with the set of data are indexed after the dataset is received from the database.

5. The computer implemented method of claim 1, wherein the number of visualizations shown on the graphical user interface is interactive visualizations that allow users to show ranges for the set of data based on the metadata associated with the set of data.

6. The computer implemented method of claim 1, wherein the number of associations comprise lineage associated with each data point in the set of data.

7. The computer implemented method of claim 1, wherein the computational model is a clustering model.

8. A computer system for optimizing computational models, comprising:

a processor set;

a set of one or more computer-readable storage media; and program instructions stored on the set of one or more storage media to cause the processor set to perform operations comprising:

receiving a dataset comprising a set of data and metadata associated with the set of data from a database, wherein the dataset is input data for a computational model;

generating a number of outputs by inputting the set of data and the metadata to the computational model;

associating the number of outputs to dataset to generate a number of associations, wherein the number of associations comprise data lineage associated with each data point in the set of data, and wherein the data lineage associated with each data points comprises complete record of origins, transformations, movements, and destinations of data for each data point in the set of data;

creating a number of visualizations based on context from the number of associations using a graphical user interface;

automatically removing a subset of data from the set of data and a subset of metadata associated with the subset of data from the metadata using a machine learning model based on the number of visualizations to generate an updated dataset;

updating functions for the computational model based on the number of visualizations; and generating updated outputs using the computational model by inputting the updated dataset to the computational model.

9. The computer system of claim 8, wherein the operations further comprise:

determining whether the updated outputs meet a pre-defined threshold; and in response to determining that the updated outputs do not meet a pre-defined threshold, repeating, the associating step, the creating step, the removing step, the updating step, and the generating step based on the updated outputs and the updated dataset until the updated outputs generated from the computational model meets the pre-defined threshold.

10. The computer system of claim 8, wherein the operations further comprise:

updating the database based on the updated functions for the computational model and the updated dataset.

11. The computer system of claim 8, wherein the set of data and metadata associated with the set of data are indexed after the dataset is received from the database.

12. The computer system of claim 8, wherein the number of visualizations shown on the graphical user interface is interactive visualizations that allow users to show ranges for the set of data based on the metadata associated with the set of data.

13. The computer system of claim 8, wherein the number of associations comprise lineage associated with each data point in the set of data.

14. The computer system of claim 8, wherein the computational model is a clustering model.

15. A computer program product, comprising:

a set of one or more computer-readable storage media;

program instructions stored in the set of one or more computer-readable storage media to perform operations comprising:

receiving, by a processor set, a dataset comprising a set of data and metadata associated with the set of data from a database, wherein the dataset is input data for a computational model;

generating, by the processor set using the computational model, a number of outputs by inputting the set of data and the metadata to the computational model;

associating, by the processor set, the number of outputs to the dataset to generate a number of associations, wherein the number of associations comprise data lineage associated with each data point in the set of data, and wherein the data lineage associated with each data points comprises complete record of origins, transformations, movements, and destinations of data for each data point in the set of data;

creating, by the processor set using a graphical user interface, a number of visualizations based on context from the number of associations;

automatically removing, by the processor set using a machine learning model, a subset of data from the set of data and a subset of metadata associated with the subset of data from the metadata based on the number of visualizations to generate an updated dataset;

updating, by the processor set, functions for the computational model based on the number of visualizations; and generating, by the processor set using the computational model, updated outputs by inputting the updated dataset to the computational model.

16. The computer program product of claim 15, wherein the operations further comprise:
   determining, by the processor set, whether the updated outputs meet a pre-defined threshold; and
   in response to determining that the updated outputs do not meet a pre-defined threshold, repeating, by the processor set, the associating step, the creating step, the removing step, the updating step, and the generating step based on the updated outputs and the updated dataset until the updated outputs generated from the computational model meets the pre-defined threshold.

17. The computer program product of claim 15, wherein the operations further comprise:
   updating, by the processor set, the database based on the updated functions for the computational model and the updated dataset.

18. The computer program product of claim 15, wherein the set of data and metadata associated with the set of data are indexed after the dataset is received from the database.

19. The computer program product of claim 15, wherein the number of associations comprise lineage associated with each data point in the set of data.

20. The computer program product of claim 15, wherein the computational model is a clustering model.

* * * * *